(12) United States Patent
Yotsumoto

(10) Patent No.: US 7,756,006 B2
(45) Date of Patent: Jul. 13, 2010

(54) COMMUNICATION DEVICE

(75) Inventor: Koji Yotsumoto, Kodaira (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 77 days.

(21) Appl. No.: 12/086,306

(22) PCT Filed: Jan. 16, 2007

(86) PCT No.: PCT/JP2007/050860
§ 371 (c)(1),
(2), (4) Date: Jun. 10, 2008

(87) PCT Pub. No.: WO2007/083782
PCT Pub. Date: Jul. 26, 2007

(65) Prior Publication Data
US 2009/0135960 A1    May 28, 2009

(30) Foreign Application Priority Data
Jan. 18, 2006    (JP) ............................ 2006-010296
Feb. 16, 2006    (JP) ............................ 2006-039828

(51) Int. Cl.
*H04J 11/00* (2006.01)
(52) U.S. Cl. ...................................... 370/210; 370/203
(58) Field of Classification Search ................. 370/203, 370/206, 208, 210
See application file for complete search history.

(56) References Cited

U.S. PATENT DOCUMENTS

| | | | | |
|---|---|---|---|---|
| 5,574,665 A | * | 11/1996 | Narasimhan ................. | 702/75 |
| 5,870,391 A | * | 2/1999 | Nago ........................ | 370/330 |
| 6,366,585 B1 | * | 4/2002 | Dapper et al. ............... | 370/409 |
| 7,012,882 B2 | * | 3/2006 | Wang et al. ................. | 370/208 |
| 7,099,642 B2 | * | 8/2006 | Fernandez-Corbaton et al. ......................... | 455/255 |
| 7,580,444 B2 | * | 8/2009 | Brown et al. ................ | 375/132 |
| 2007/0223611 A1 | * | 9/2007 | Ode et al. .................... | 375/260 |
| 2007/0280098 A1 | * | 12/2007 | Bhatt et al. ................. | 370/208 |
| 2008/0107223 A1 | * | 5/2008 | Yanagidate ................. | 375/376 |

FOREIGN PATENT DOCUMENTS

| | | |
|---|---|---|
| JP | 07-282385 | 10/1995 |
| JP | 2003-125449 | 4/2003 |
| JP | 2005-39461 | 2/2005 |
| JP | 2005-203883 | 7/2005 |

OTHER PUBLICATIONS

International Search Report issued Feb. 20, 2007 in the International (PCT) Application of which the present application is the U.S. National Stage.

* cited by examiner

*Primary Examiner*—Chi H Pham
*Assistant Examiner*—Robert Lopata
(74) *Attorney, Agent, or Firm*—Wenderoth, Lind & Ponack, L.L.P.

(57) ABSTRACT

In a communication device for receiving signals from devices that become communication partners, received signals from the respective devices are identified. Each of the devices that become communication partners is provided with a frequency spectrum of a pattern specific to each of the devices. The communication device stores correspondence between information identifying the devices that become communication partners and the frequency spectrums provided to the respective devices, acquires a frequency spectrum contained in a received signal, compares the frequency spectrum acquired with the frequency spectrums stored to identify a device corresponding to the frequency spectrum that coincides with the frequency spectrum acquired and which is stored.

6 Claims, 15 Drawing Sheets

COMMUNICATION DEVICE

BACKGROUND OF THE INVENTION

1. Technical Field

The present invention relates to a communication device for receiving a signal through a propagation channel and, in particular, to a communication device for compensating distortion in a propagation channel by a simple construction or a simple processing.

In addition, the present invention relates to an effective technology for identifying a received signal of each of plural other communication devices when receiving signals from the plural other communication devices.

2. Background Art

For example, it has been well known that when the wireless transfer function of expressing distortion in a wireless propagation channel can be extracted, the function of its inverse characteristics can be produced to be able to cancel characteristic degradation in the wireless propagation channel with large effect. However, a processing capacity required to find the wireless transfer function is high, so that it is difficult to realize the wireless transfer function in an actually operated wireless system. Hence, there are few examples of bringing the wireless transfer function into practical use.

In FIG. 7, a construction example of a receiver is shown as one construction example in which propagation channel distortion compensation is applied to a base station device (W-CDMA base station device) employing a W-CDMA (Wideband-Code Division Multiple Access) system of a 3GPP wireless system of a global standard.

The W-CDMA base station device of this example includes: a received data storage memory 21; a subtractor 22; a channel synchronization control section 23; a pilot channel inverse diffusion function section 24; a phase control section 25; a data inverse diffusion function section 26; a multiplier 27; a RAKE synthesis section 28; a demodulation section 29; a replica control section 30; a data hard-determination section 31; a path multiplication section 32; a multiplier 33; a diffusion function section 34; a replica storage-memory 35; a propagation channel distortion storage memory 36: and a subtractor 37.

Here, the function sections added so as to compensate distortion in the propagation channel are, for example, the received data storage memory 21, the replica control section 30, the data hard-determination section 31, the path multiplication section 32, the multiplier 33, the diffusion function section 34, the replica storage memory 35, the propagation channel distortion storage memory 36, and the subtractor 37.

One example of the operation performed by the W-CDMA base station device of this example will be described.

Received signals (received data) from a certain terminal device (for example, terminal device 1) are inverse diffused by the data inverse diffusion function section 26, and a pilot channel is inverse diffused by the pilot channel inverse diffusion function section 24, and phase compensation (complex multiplication, in this example) is performed to the result of the inverse diffusion performed by the data inverse-diffusion function section 26 by the phase control section 25 and the multiplier 27 on the basis of a phase rotation amount computed from the pilot channel, and the synthesis of multiple paths is performed to the result of the phase compensation (RAKE synthesis) by the RAKE synthesis section 28. In this case, the synchronization of the received signals is achieved by the channel synchronization control section 23, whereby the synchronous timing of the pilot channel inverse diffusion function section 24 and the data inverse diffusion function section 26 is controlled.

Here, when the synthesis result obtained by the RAKE synthesis section 28 is inputted to the demodulation section 29 as it is, there is provided a usual signal processing to which propagation channel distortion compensation is not performed.

On the other hand, when the propagation channel distortion compensation is performed, the value (0, 1) of the data is determined by the data hard determination section 31 (data hard determination) on the basis of the synthesis result obtained by the RAKE synthesis section 28 and the determination result is copied for each of multiple paths. The multiple paths produced by the copying are multiplied (complex multiplied in this example) by the phase rotation amount found by the phase control section 25 and the multiplication results are again diffused by the diffusion function section 34.

With this, an ideal signal (replica) estimated to be transmitted from the concerned terminal device (terminal device 1, in this example) can be produced and the replica is stored in the replica storage memory 35.

This replica is subtracted from the entire received signals (entire received data) by the subtractor 22, and then on the basis of the subtraction result, in the same way as described above, the inverse diffusion, the phase compensation, and the RAKE synthesis are performed to a received signal from the other terminal device (for example, terminal device 2) and further the hard determination, the path multiplication, the phase rotation, and diffusion are performed to the data to thereby produce a replica. Then, in the same way as described above, the replica of the terminal device 1 is further subtracted from the entire received signals from which the replica of the terminal device 1 is subtracted.

Thereafter, in the same way, the replica of the terminal device 3 is subtracted from the entire received signals . . . , then, the replica of the terminal device 4 is subtracted from the entire received signals . . . and so on . . . , in other words, the replicas of all terminal devices from which data is to be received are subtracted from the entire received signals. As the result, the wireless transfer function of expressing distortion in the propagation channel can be found.

In this regard, the number of productions of the replica is controlled by the replica control section 30, whereby the input to the subtractor 22 is set on or off and the destination of output from the RAKE synthesis section 28 is switched and controlled.

The results obtained by subtracting the replicas of all terminal devices, from which data is to be received, from the entire received signals are stored as the results of found distortion in the propagation channel in the propagation channel distortion storage memory 36. These results are subtracted from the entire received signals by the subtractor 37 to thereby cancel (compensate) the propagation channel distortion of the entire received signals.

Then, for example, when the data of the terminal device 1 is acquired, all replicas of the terminal devices 2 and subsequent terminal devices (in other words, replicas of all terminal devices except for the terminal device 1) and the propagation channel distortion are subtracted from the entire received signals, and then the inverse diffusion, the phase compensation, the RAKR synthesis, and the demodulation processing are performed to the results, whereby an optimal solution can be obtained.

Further, in the above-mentioned processing, the produced replicas can contain errors caused by the distortion and hence cannot be perfect. Still further, the propagation channel distortion found by the use of the replicas cannot be also perfect. For this reason, the procedure of producing a replica again on the basis of the received signal obtained by subtracting the propagation channel distortion that has been once found is repeatedly performed. With this, the propagation channel distortion and replica that contain fewer errors can be produced and hence the received data that contain fewer errors can be found. When this procedure is repeatedly performed to make errors converge, ideal characteristics can be obtained.

Patent document 1: JP-A 2003-115786

Patent document 2: JP-A 2003-519962

Patent document 3: JP-A 2005-516442

SUMMARY OF THE INVENTION

However, in the communication device for performing the above-mentioned propagation channel distortion compensation shown in FIG. 7, the construction and processing for performing the propagation channel distortion compensation become very complicated and hence the processing of placing a heavy load on the communication device is required. Thus, even if the communication device is expected to achieve an improvement in characteristics, it is actually difficult to apply the communication device to an actually operated system.

The present invention has been made in view of this circumstance in the related art. An object of the present invention is to provide a communication device capable of performing propagation channel distortion compensation by a simple construction and a simple processing.

Further, another object of the present invention is to provide a communication device capable of identifying a received signal from each of plural other communication devices when receiving signals from the plural other communication devices.

Still further, for example, the patent document 2 and the patent document 3 disclose a method and a device for removing noises such as quantization noises from data received from a communication channel, but in this technology in the related art, as will be described later, it cannot be said that a sufficient dynamic range can be ensured when a received analog signal is converted to a digital signal.

Thus, still another object of the present invention is to provide a communication device capable of ensuring a sufficient dynamic range for a communication system.

To achieve the above-mentioned objects, a communication device according to the present invention has the following construction.

That is, a communication device according to the present invention is a communication device for receiving a signal from a device that becomes a communication partner, and the device that becomes a communication partner is provided with a frequency spectrum of a pattern specific to the device. Here, such frequency spectrum may be provided to the communication device according to the present invention.

In the communication device, storage means stores correspondence between information identifying the device that becomes a communication partner and the frequency spectrum provided to the device. Acquisition means acquires a frequency spectrum contained in a received signal. Identification means compares (for example, checks) the frequency spectrum acquired by the acquisition means with (against) the frequency spectrum stored by the storage means to thereby identify a device corresponding to the frequency spectrum that coincides with the frequency spectrum acquired by the acquisition means and which is stored by the storage means.

Thus, when each device that becomes a communication partner is provided with the frequency spectrum of a pattern specific to the device and the signal of the frequency spectrum provided to the device is transmitted from each device, the communication device can identify a device corresponding to a stored frequency spectrum coinciding with a frequency spectrum contained by the received signal as being the source of transmission of the received signal on the basis of information relating to the frequency spectrum of the pattern specific that are previously stored. In this manner, according to an effective construction such that the frequency spectrum of a pattern specific to each device is used in this manner, for example, when the communication device receives signals from the other plural communication devices, the communication device can identify the received signals from these plural other communication devices.

Here, as for the communication device and the devices that become communication partners thereof, various kinds of devices can be used: for example, a wireless base station device can be used as the communication device and a terminal device such as a wireless mobile device can be used as the device of the communication partner thereof; alternatively, a wireless terminal device can be used as the communication device and a wireless base station device can be used as the device of the communication partner thereof.

Further, the number of devices that become communication partners may be one or may be plural. For example, in many usual cases, the number of communication partners of the base station device becomes plural and the number of communication partners of the terminal device is one base station device.

Still further, the signal transmitted from the device that becomes a communication partner contains a frequency spectrum of a specific pattern. For example, there may be provided a channel for communicating the frequency spectrum of the specific pattern.

Still further, various frequency spectrums may be used as the frequency spectrum of a specific pattern provided to each device: for example, a frequency spectrum having a fixed pattern not changing with time can be used; or a frequency spectrum changing with time according to a specified pattern can be used.

Still further, various information may be used as information for identifying the device: for example, identification information (ID information) using a device number or the like can be used.

Still further, the storage means can be constructed by use of a memory.

Still further, as for the mode of acquiring the frequency spectrum contained by the received signal, for example, when a received signal is received from one device, the mode of acquiring its frequency spectrum can be used, and when the received signal contains signals from plural devices, there can be used the mode of acquiring the frequency spectrums from the respective device by estimating received plural frequency spectrums on the basis of the received signal. Taking one example, when the correlation between the frequency spectrum of the received signal and the frequency spectrums of the respective devices is examined, it is possible to estimate that a frequency spectrum having a high correlation is contained by the received signal.

Still further, the processing of acquiring a signal (frequency spectrum) of frequency domain from a signal of time domain can be performed, for example, by the use of the function of Fourier transform.

Still further, when a frequency spectrum coinciding with the frequency spectrum acquired from the received signal is detected, there can be used not only the mode of detecting a frequency spectrum such that both of the frequency spectrums completely coincide with each other but also, for example, the mode of detecting a frequency spectrum such that because the frequency spectrum can be thought to contain a few errors in actuality, both of the frequency spectrums do not completely coincide with each other but coincide with (are similar with) each other at a previously set degree.

In addition, when a frequency spectrum changing with time according to a specified pattern is used as the frequency spectrum of a specific pattern that is provided to each device, the synchronization of timing can be achieved on the basis of a temporal change in the pattern of the frequency spectrum acquired from the received signal.

Taking one example, the above-mentioned identification means identifies receiving timing on the basis of a temporal change in the pattern of the frequency spectrum acquired by the above-mentioned acquisition means.

A communication device according to the present invention is constructed in the following manner.

That is, the communication device according to the present invention is a communication device for receiving a signal from a device that becomes a communication partner through a propagation channel, and the device that becomes a communication partner is provided with a frequency spectrum of a pattern specific to the device. Here, such frequency spectrum may be provided to the communication device according to the present invention.

In the communication device, storage means stores correspondence between information for identifying the device that becomes a communication partner and the frequency spectrum provided to the device. Filter information production means subtracts the frequency spectrum stored by the storage means in correspondence with the device that becomes a source of transmission of a received signal from a frequency spectrum of the received signal to thereby detect the characteristic of the propagation channel and produces information for realizing a filter having inverse characteristic of the characteristic.

In this regard, further, the communication device can also have the same function as the above-mentioned identification means, thereby being able also to identify the device that becomes the source of transmission of the received signal and to identify receiving timing.

Thus, it is possible to detect the characteristic of the propagation channel (characteristic of distortion in the propagation channel) by reducing the frequency spectrum of the device that becomes the source of transmission from the frequency spectrum of the received signal and to realize a filter having inverse characteristic thereof on the basis of this characteristic. In this manner, it is possible to compensate distortion in the propagation channel by the simple construction and processing. Here, such processing can be performed, for example, in the frequency domain.

Here, as for an object subtracted from the received signal (frequency spectrum stored by the storage means in correspondence to the device that becomes the source of transmission of the received signal), for example, when the number of devices from which the signal is to be received is one, the frequency spectrum stored by the storage means in correspondence to the concerned device is used, and when the number of devices from which the signals are to be received is plural, a synthesis of the frequency spectrums stored by the storage means in correspondence to these respective devices is used. The result acquired by subtracting all frequency spectrums predicted to be received from the frequency spectrum of the received signal corresponds to the characteristic of the propagation channel.

Further, the inverse characteristic of the characteristic of the propagation channel corresponds to, for example, the result obtained by subtracting the characteristic of the propagation channel from the characteristic of a decorrelated filter (for example, characteristic that does not depend on frequency and hence is of a flat level) or the characteristic of a low-pass filter (LPF).

Further, various kinds of information may be used as the information for realizing the filter: for example, it is possible to use the information of the pattern of a frequency spectrum by which the frequency spectrum of the received signal is to be multiplied as the filtering processing.

The communication device according to the present invention employs the following construction as one construction example.

That is, filtering implementation means filters the received signal by use of the information produced by the above-mentioned filter information production means.

Thus, it is possible to compensate the propagation channel distortion by the simple construction and processing. Here, such processing can be performed, for example, in the frequency domain.

Further, for example, the processing of acquiring a signal of time domain from a signal of frequency domain (frequency spectrum) may be performed after compensating the propagation channel distortion. Such processing can be performed by the use of, for example, the function of inverse Fourier transform.

Here, as for the filtering processing, it is possible to use, for example, the mode of multiplying the received signal by the inverse characteristic of the characteristic of the propagation channel to cancel (compensate) the characteristic of the propagation channel (characteristic of distortion in the propagation channel) from the received signal.

In addition, for example, when a channel for communicating the frequency spectrum of a specific pattern is different from a channel for communicating data, the function of a filter is realized on the basis of the received signal of the channel for communicating the frequency spectrum of a specific pattern and the received signal of the channel for communicating data is filtered by the function of the filter. In this manner, it is possible to compensate the data signal for the propagation channel distortion.

The communication device according to the present invention is constructed as follows.

That is, word length adjustment means converts a digitalized received signal of time domain to a frequency spectrum of a signal of frequency domain and shifts a plural number of bits contained by the converted signal and then reconverts the signal to a signal of time domain.

Thus, when the effective word length is increased through the conversion/reconversion of the digitalized received signal, bits are shifted to prevent overflow or digit loss and hence the dynamic range provided by the word length can be effectively used. Thus, it is possible to ensure a dynamic range sufficient for the communication system.

DETAILED DESCRIPTION OF THE INVENTION

Embodiments according to the present invention will be described with reference to the drawings.

Figure 1:
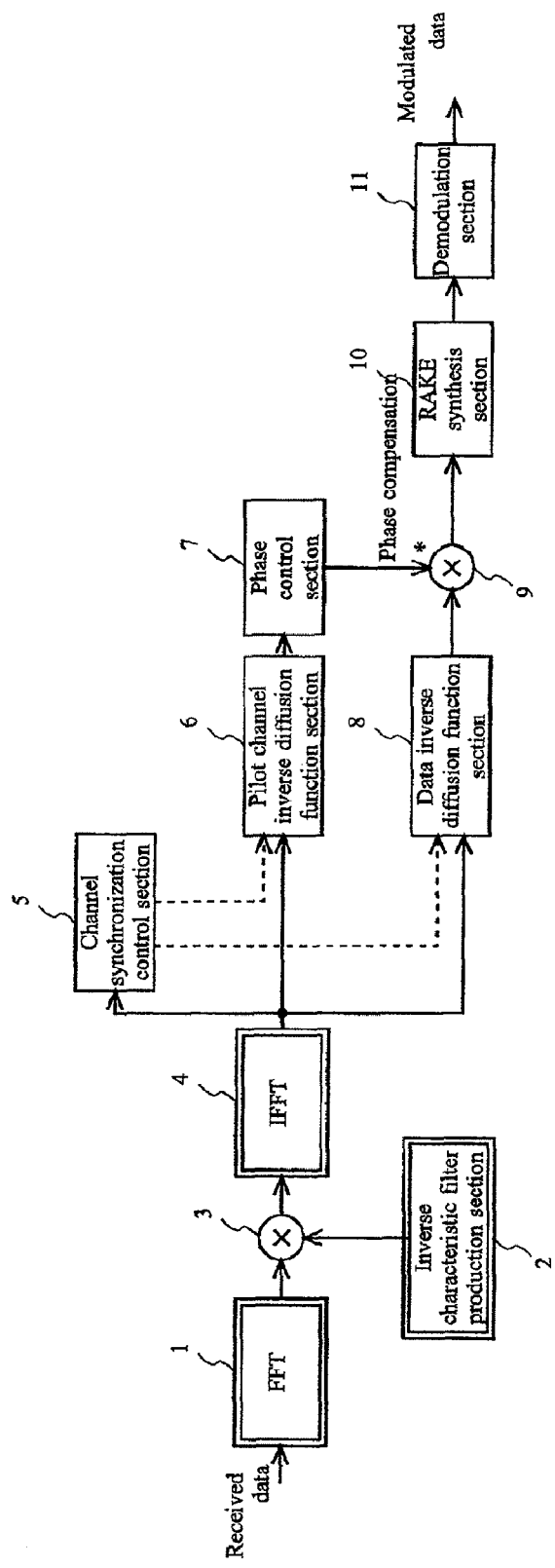
FIG. 1 is a block diagram showing a construction example of a W-CDMA base station device according to one embodiment of the present invention.

In FIG. 1 is shown a construction example of a receiver as a construction example of a W-CDMA base station device for performing propagation channel distortion compensation according to one embodiment of the present invention.

The W-CDMA base station device of this embodiment includes: a fast Fourier transform (FFT) section 1; a inverse characteristic filter production section 2; a multiplier 3; an inverse fast Fourier transform (Inverse FFT) section 4; a channel synchronization control section 5; a pilot channel inverse diffusion function section 6; a phase control section 7; a data inverse diffusion function section 8; a multiplier 9; a RAKE synthesis section 10; and a demodulation section 11.

Here, the function sections added so as to compensate distortion in the propagation channel, in this example, are the FFT section 1, the inverse characteristic filter production section 2, the multiplier 3, and the IFFT section 4.

The W-CDMA base station device of this example communicates a signal wirelessly between plural terminal devices through a wireless propagation channel. Further, the W-CDMA base station device itself is also provided plurally and the plural W-CDMA base station devices are arranged at different positions.

In this example, an individual specific frequency spectrum is assigned to each of the terminal devices and each of the base station devices.

Figure 2:
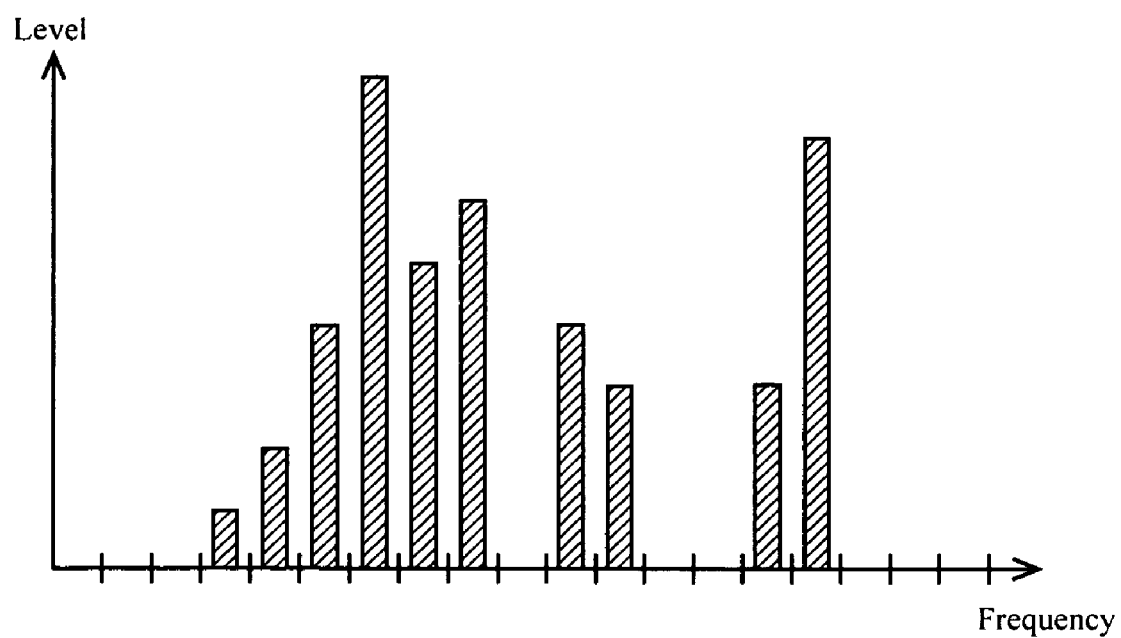
FIG. 2 is a graph showing one example of a frequency spectrum specific to each device.

In FIG. 2 is shown an example of a frequency spectrum specific to each of the devices. In the graph shown in FIG. 2, a lateral axis designates a frequency and a vertical axis designates a level. In the frequency spectrum of this example, a pattern is specified by a combination of levels of the plural frequencies.

A frequency spectrum of a pattern shown in FIG. 2 is assigned to a certain device (a certain terminal device or a certain base station device, in this embodiment) and frequency spectrums of different patterns are assigned to the respective other devices.

Further, while an example of a frequency spectrum having a constant pattern irrespective of time is shown in FIG. 2, a frequency spectrum of a constant pattern changing with time can be used as other construction example. In this case, for example, a frequency spectrum that is the same as other frequency spectrum at some timing but is different from the other frequency spectrum as an entire changing pattern can be identified and hence can be assigned to a different device.

The specific frequency spectrum like this has a waveform, which is similar to data diffused by, for example, the W-CDMA system of a global standard, in time domain. Here, the waveform in the time domain can be produced by subjecting a specific frequency spectrum to the IFFT processing.

In this embodiment, a channel showing the above-mentioned specific frequency spectrum is referred to as a spectrum pilot channel (SP-pilot CH).

In this embodiment, each of the terminal devices or each of the base station devices can be identified and distinguished by the spectrum pilot channel.

The receiver of each terminal device or each base station device stores the pattern of the spectrum pilot channel of this embodiment in a memory and handles it as an already-known pattern, just as with a usual pilot channel (using a pilot in the time domain). For example, a usual pilot in the time domain is required to have a phase state compensated and hence cannot be identified unless it is subjected to demodulation processing. On the other hand, the spectrum pilot channel according to the pilot of frequency domain of this embodiment is handled in the frequency domain, so that the specific frequency spectrum is not related to the phase state and can be identified even if it is not subjected to the demodulation processing.

Further, as another construction example, in the case where a spectrum pilot channel using a pilot of the frequency domain has a pattern changing with time, timing can be extracted by checking the pattern against the received data.

Figure 3:
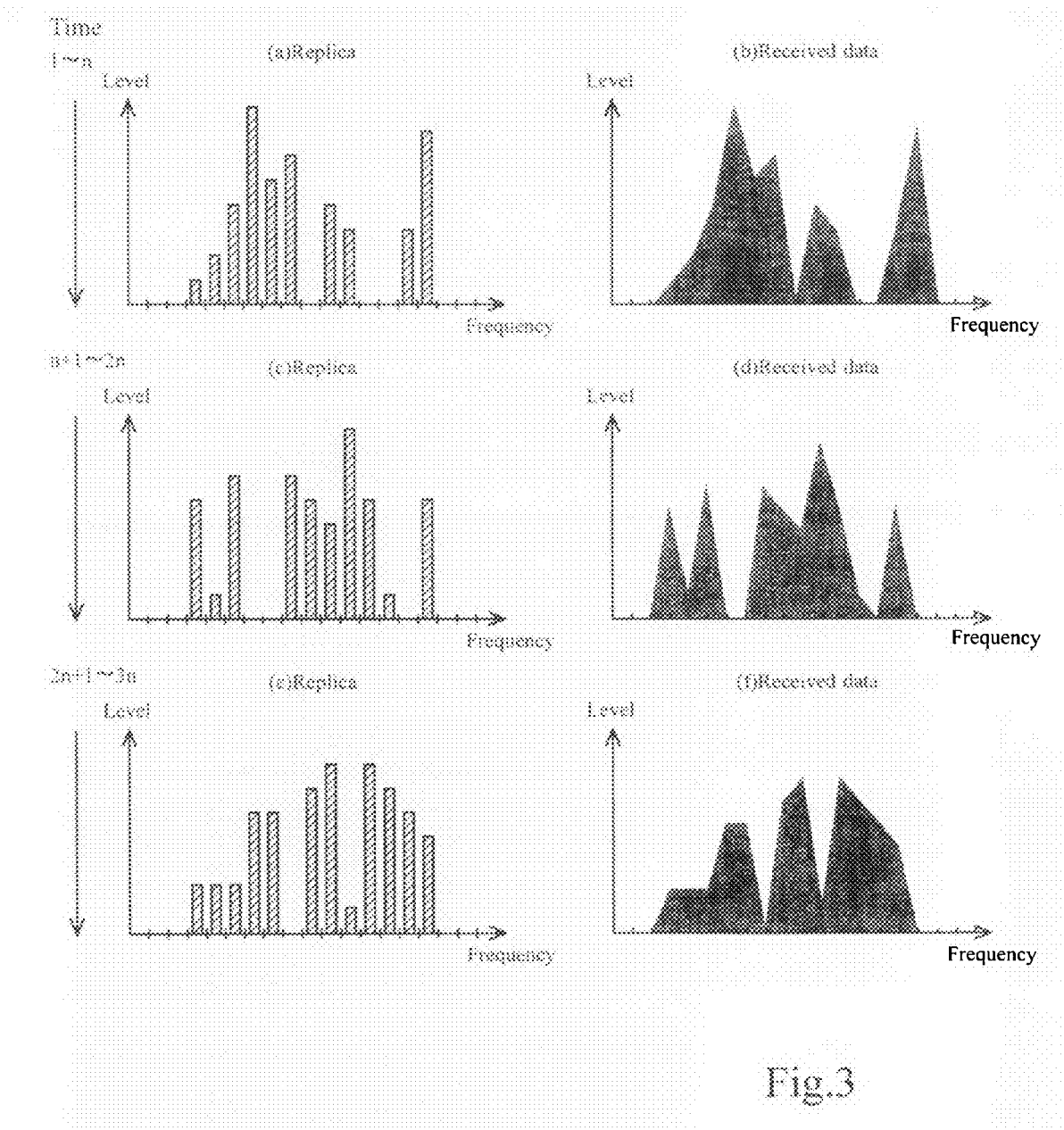
FIG. 3 are graphs showing one example of a spectrum pattern changing with time.

In FIG. 3 is shown one example of a spectrum pattern changing with time.

In this embodiment, it is assumed that the FFT used in the device has 1024 points and that the spectrum pilot channel is of a format to produce one pattern by performing n FFT operations of 1024 points (where n is plural). In this case, the results of the n FFT operations can be averaged and the first averaged result of the n FFT operations forms the first pattern, and then the next n (from (n+1) to 2n) FFT operations produce the next pattern, ditto for the subsequent n FFTs. Timing of communication channel can be determined by finding the pattern timing of the spectrum pilot pattern coinciding with the spectrum pattern of the received data.

Specifically, FIG. 3 shows (a) the replica of a frequency spectrum and (b) received data in time from 1 to n, (c) the replica of a frequency spectrum and (d) received data in time from (n+1) to 2n, and (e) the replica of a frequency spectrum and (f) received data in time from (2n+1) to 3n. Here, in the graphs (a) to (f) in FIG. 3, a lateral axis designates a frequency and a vertical axis designates a level.

One example of an operation performed by the W-CDMA base station device of this embodiment will be described.

The received signals from all terminal devices and the entire received signals containing distortion in the propagation channel (the entire received data) are inputted to the FFT section 1.

The FFT section 1 performs the FFT processing to the inputted signal to thereby convert the signal of the time domain to the spectrum of the frequency domain and outputs the result to the multiplier 3.

The inverse characteristic filter production section 2 produces a spectrum pattern of the frequency domain that realizes a filter having characteristics inverse to the transfer function expressing the distortion in the propagation channel and outputs the produced spectrum pattern to the multiplier 3. Here, the inverse characteristic filter production section 2 produces a spectrum pattern to realize a desired filter, for example, on the basis of the output from the FFT section 1 and the information of a previously stored spectrum pattern.

The multiplier 3 multiplies a frequency spectrum inputted from the FFT section 1 by a frequency spectrum inputted from the inverse characteristic filter production section 2 to perform the filtering of a filter realized by the inverse characteristic filter production section 2 to the input from the FFT section 1 outputs the result to the IFFT section 4. The propagation channel distortion contained by the received signal is canceled (compensated) by this filtering.

The IFFT section 4 subjects the frequency spectrum inputted from the multiplier 3 to the IFFT processing to convert the spectrum of the frequency domain to the signal of the time domain and then outputs the result to the channel synchronization control section 5, the pilot channel inverse diffusion function section 5, and the data inverse diffusion function section 8.

The channel synchronization control section 5 achieves channel synchronization for a desired terminal device (user) on the basis of the signal that is inputted from the IFFT section 4 and which is already compensated for the propagation channel distortion compensation, and controls the synchronous timing between the pilot channel inverse diffusion function section 6 and the data inverse diffusion function section 8.

The pilot channel inverse diffusion function section 6 inversely diffuses the pilot channel for a desired terminal device on the basis of the signal that is inputted from the IFFT section 4 and which is already compensated for the propagation channel distortion, and outputs the result to the phase control section 7.

The phase control section 7 detects a phase rotation amount produced in the received signal on the basis of the inverse diffusion result that is inputted from the pilot channel inverse diffusion function section 6, and outputs a value for canceling (compensating) the phase rotation amount to the multiplier 9.

The data inverse diffusion function section 8 inversely diffuses the received signal (received data) for a desired terminal device on the basis of the signal that is inputted from the IFFT section 4 and which is already compensated for the propagation channel distortion, and outputs the result to the multiplier 9.

The multiplier 9 complexly multiplies the inverse diffusion result inputted from the data inverse diffusion function section 8 by the value inputted from the phase control section 7 to compensate (in other words, inversely rotate) the phase rotation of the inverse diffusion result and outputs the result to the RAKE synthesis section 10.

The RAKE synthesis section 10 synthesizes multiple paths (RAKE synthesis) of the inverse diffusion result that is inputted from the multiplier 9 and which is already compensated for the phase for a desired terminal device, and outputs the result to the demodulation section 11.

The demodulation section 11 demodulates the received data for a desired terminal device on the basis of the synthesis result inputted from the RAKE synthesis section 10.

Next, the processing of the propagation channel distortion compensation of this embodiment will be described in detail.

Figure 4:
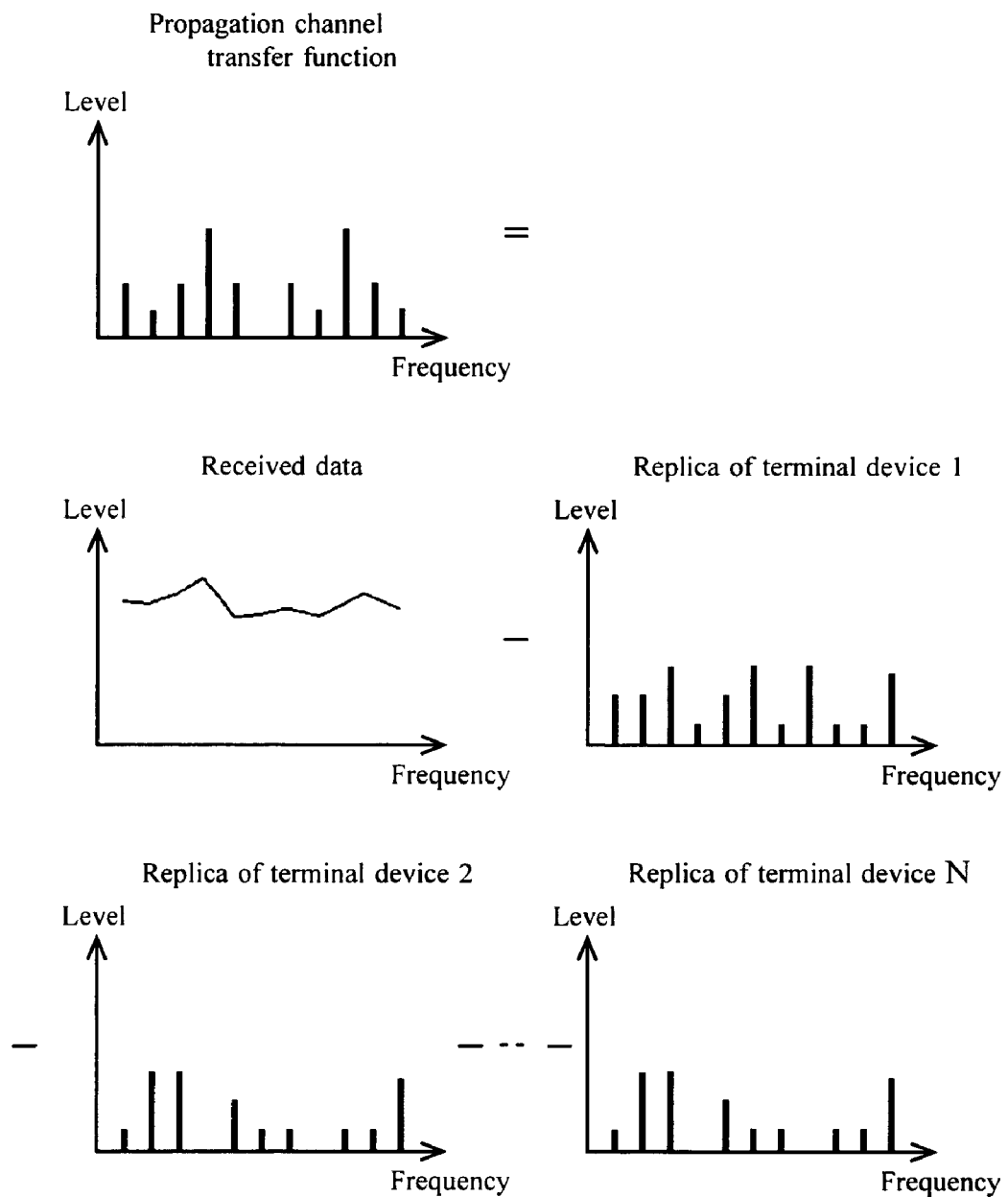
FIG. 4 are graphs showing extraction of a transfer function of propagation channel distortion.

In FIG. 4 is shown an image of extracting a transfer function (propagation channel transfer function) expressing distortion in the propagation channel.

As shown in FIG. 4, it is assumed that the result obtained by subtracting specific frequency spectrums (ideal replicas, in this embodiment) of all terminal devices (for example, a plural number of terminal devices 1 to N) from the frequency spectrum of the entire received signals is the frequency spectrum of the propagation channel transfer function. Here, for example, the level of the replica of each terminal device may be adjusted according to the level of the received signal.

Here, the W-CDMA base station device of this embodiment stores information identifying spectrum pilot channels (specific frequency spectrum) assigned to the respective terminal devices, from which the W-CDMA base station device is to receive data, in the memory. Here, when a wireless system selecting timing by the use of a spectrum pilot channel having a pattern changing with time is used, for example, timing is extracted first.

In the W-CDMA base station device of this embodiment, an ideal replica for all terminal devices can be produced in advance by synthesizing the already-known spectrum pilot channels (specific frequency spectrums) of the respective terminal devices. Then, the FFT section 1 performs the FFT processing the received signal to convert the received signal to the frequency spectrum and subtracts the ideal replica for all terminal devices from the frequency spectrum of the entire received signals, whereby the propagation channel transfer function can be easily produced.

In this regard, in the actual communication system, usually, the signal of a channel other than the spectrum pilot channel is also communicated, so that it is desirable that the acquired propagation channel transfer functions are averaged (for example, averaged for time) to remove variations caused by the other channels. In addition, in a fading environment, even if a replica is ideal, original received data vary and hence the averaging of the propagation channel transfer functions is usually a necessary processing.

Further, as another construction example can be also employed a construction in which the communication of the other channel is once interrupted at the timing when the propagation channel transfer function is produced. In this case, a more stable propagation channel transfer function can be acquired.

Still further, the case of application to the base station device has been shown in this example. However, for example, in the case of application to the terminal device, usually, the number of base station device during communication is one, so that by storing or producing the ideal replica of the spectrum pilot channel (specific frequency spectrum) of the base station device and by subtracting the ideal replica from the received signal, a stable propagation channel transfer function can be easily produced.

Figure 5:
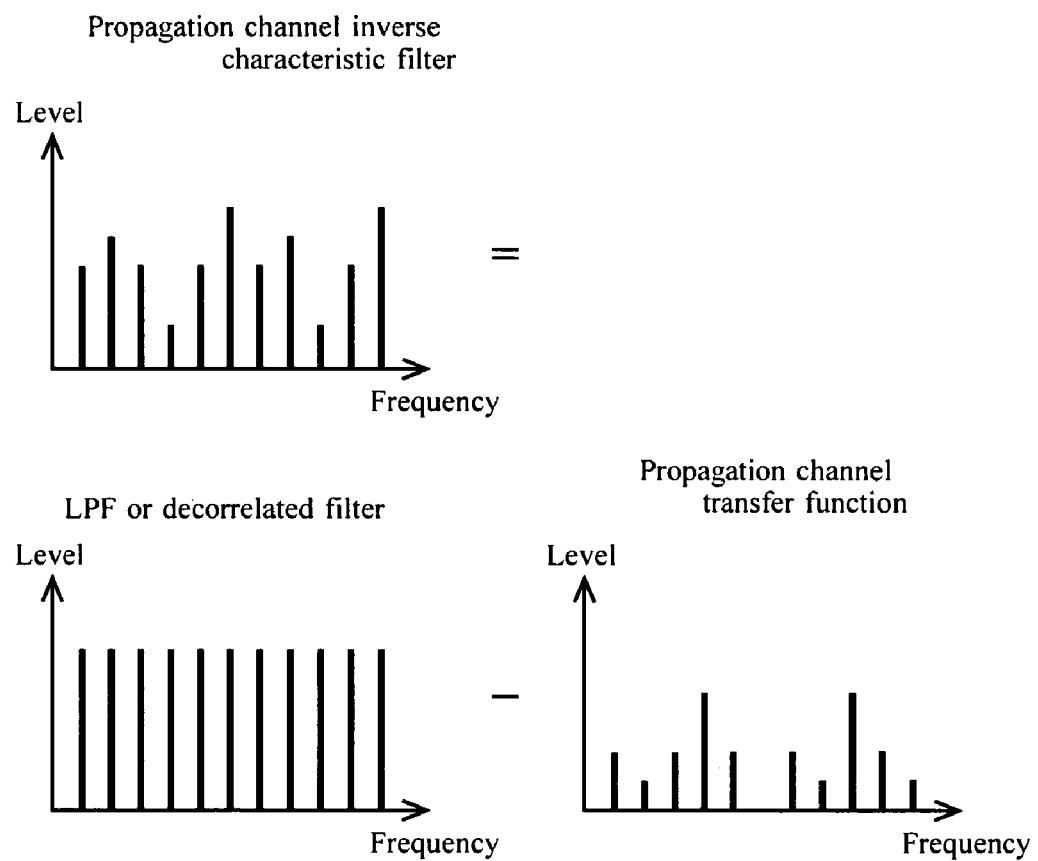
FIG. 5 are graphs showing production of an inverse characteristic filter.

In FIG. 5 is shown an image of producing the frequency spectrum of a filter (propagation channel inverse characteristic filter) realizing the inverse characteristics of the propagation channel.

As shown in FIG. 5, a filter having the structure of subtracting the frequency spectrum of the propagation channel transfer function acquired in the above-mentioned manner from a frequency spectrum having the characteristics of a low-pass filter (LPF) or a frequency spectrum having the characteristics of an uncorrelated filter, in other words, a filter having the structure of subtracting level values in these respective frequencies becomes a propagation channel inverse characteristic filter, and this subtraction result becomes the frequency spectrum of the propagation channel inverse characteristic filter. In this example, the processing shown in FIG. 4 and the processing shown in FIG. 5 are performed by the inverse characteristic filter production section 2. Further, such processing is performed in the frequency domain and hence is an easy processing.

Here, in this example, the processing is performed in the frequency domain, so that, as described above, not only the example of finding the function of the propagation channel inverse characteristic filter by subtracting the propagation channel transfer function from the function of the uncorrelated filter, but also an example of adding the characteristics of an LPF to the propagation channel inverse characteristic filter by finding the function of a propagation channel inverse characteristic filter by subtracting the propagation channel transfer function from the function of the LPF can be easily realized as other example. In this example of adding the characteristics of the LPF to the propagation channel inverse characteristic filter, usually, the LPF that usually requires a large scale circuit as a FIR (Finite Impulse Response) filter can be realized without adding processing in the process of producing the inverse characteristic filter of the propagation channel distortion.

Figure 6:
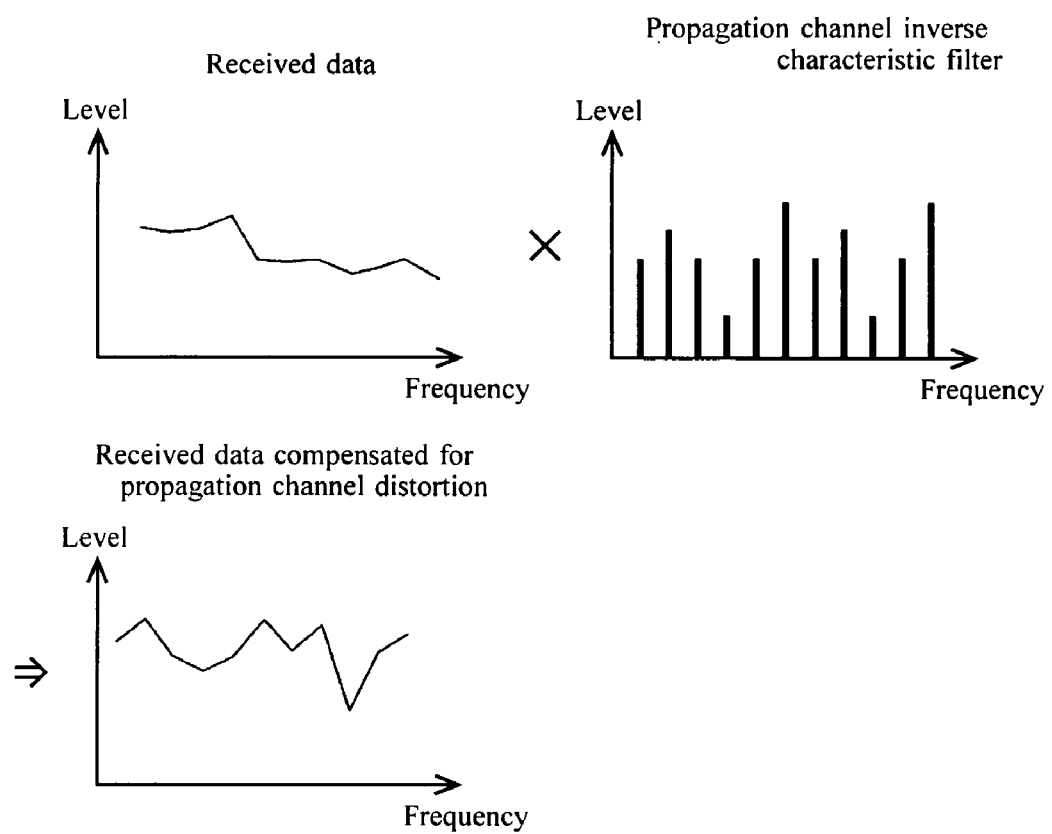
FIG. 6 are graphs showing production of distortion compensation data.
Figure 7:
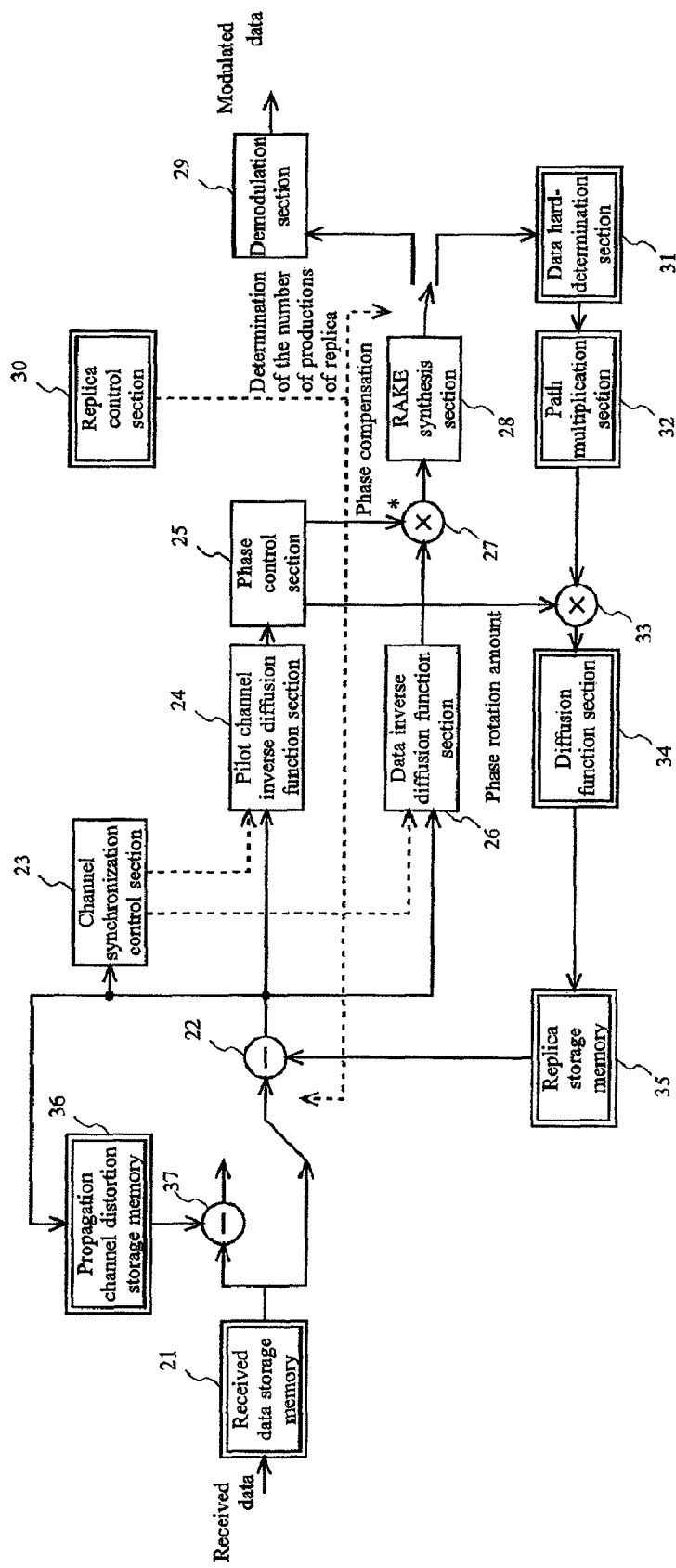
FIG. 7 is a block diagram showing a construction example of a W-CDMA base station device.

In FIG. 6 is shown an image of acquiring the entire received signals (received data compensated for propagation channel distortion), which have the propagation channel distortion removed, through the propagation channel inverse characteristic filter. In this example, this processing is performed by the multiplier 3 and the received signals are multiplied by the level values for the respective frequencies. Here, in the example of adding the characteristics of the LPF to the propagation channel inverse characteristic filter, filtering by the LPF is also realized at the same time of removing the propagation channel distortion.

Further, when the IFFT section 4 performs the IFFT processing to the signals (received data compensated for propagation channel distortion) acquired in this manner, the received signal in the time domain which has the propagation channel distortion removed can be acquired. Here, in the example of adding the characteristics of the LPF to the propagation channel inverse characteristic filter, the received signal in the time domain, which has the propagation channel distortion removed and passes through the LPF, can be acquired.

As described above, in the wireless communication system of this embodiment, each terminal device or each base station device is provided with the frequency spectrum of a pattern fixed with respect to time or a fixed pattern changing with time. Further, each of the base station devices or the terminal devices has the function of synthesizing the frequency spectrums of the plural terminal devices and the plural base station devices.

Further, each of the base station devices or the terminal devices has the function of comparing the frequency spectrum assigned to each terminal device or each base station device with the frequency spectrum of the actually received signal to identify the device (terminal device or base station device) in which these frequency spectrums coincide with each other. Still further, each of the base station devices or the terminal devices has the function of identifying the timing of the received data from the device (terminal device or base station device) identified by such comparison, for example, when such frequency spectrum has a pattern changing with time.

Still further, each of the base station devices or the terminal devices has the function of checking the synthesis of the frequency spectrums of the terminal devices or the base station devices or the synthesis of the frequency spectrums of all devices, from which data is to be received, against the frequency spectrum of the actually received signal to extract the wireless propagation channel characteristic (transfer function) and of producing a filter having the inverse characteristic of the characteristic. Further, each of the base station devices or the terminal devices has the function of passing the actually received signal through the filter to improve the characteristics.

In this manner, in the wireless communication system of this embodiment, each of the terminal devices or the base station devices is provided with the frequency spectrum of the fixed frequency spectrum as shown in FIG. 2 or the frequency spectrum having a fixed pattern changing with time as shown in FIG. 3. Each of the terminal devices or the base station devices can compare such frequency spectrum with the spectrum of the actually received signal to identify the terminal device or the base station device corresponding to the received signal. Further, when each of the terminal devices or the base station devices uses the frequency spectrum having a fixed pattern changing with time, each of the terminal devices or the base station devices can identify the timing of the received data.

Further, each of the terminal devices or the base station devices can extract the propagation channel transfer function from frequency spectrums of the respective devices or the synthesis of the frequency spectrums of the plural devices and the received signal, as shown in FIG. 4, and can produce the propagation channel inverse characteristic filter from the extracted propagation channel transfer function, as shown in FIG. 5. In addition, as shown in FIG. 6, each of the terminal devices or the base station devices can acquire the received data compensated for the propagation channel distortion by passing the received signal through the propagation channel inverse characteristic filter.

Thus, in the wireless communication system of this embodiment, by the use of the spectrum pilot channel using the frequency spectrum, it is possible to identify the terminal device or the base station device and to compensate the received signal for the propagation channel distortion. In this embodiment, by the simple construction and processing, it is possible to extract the propagation channel distortion and to produce the filter having its inverse characteristic and to compensate the received signal for degradation caused by the propagation channel distortion. Hence, it is possible to compensate the received signal for the propagation channel distortion without using a large scale structure or placing a heavy load to the device.

Here, the construction using the spectrum pilot channel like this embodiment is effective, in particular, to a wide band communication system of the third generation communication system and its subsequent generation communication systems.

Further, the construction using the spectrum pilot channel like this embodiment can be applied to, for example, a wireless communication system employing an OFDM (Orthogonal Frequency Division Multiplexing) system having the FFT function or the IFFT function. In the OFDM system, usually, the transmitter is provided with the IFFT function and the receiver is provided with the FFT function, so that these functions can be utilized. For example, as for the FFT section 1 and the IFFT section 4 shown in FIG. 1, the receiver of the OFDM system is provided with the FFT function and hence the FFT function can be utilized as the function of the FFT section 1. Further, the receiver is not required to have the IFFT function and hence the IFFT section 4 can be omitted. Thus, the receiver can be further simply constructed.

In this regard, in the communication device of this embodiment (W-CDMA base station device, in this embodiment), storage means is constructed of, for example, the function of storing the frequency spectrum having a specific pattern assigned to each device (each terminal device, in this embodiment) in the memory such as the inverse characteristic filter production section 2; acquisition means is constructed of the function of acquiring the frequency spectrum contained in the received signal by the function of the FFT section 1; identification means is constructed of the function such that, for example, the inverse characteristic filter production section 2 (or control section not shown) or the like identifies the device corresponding to the frequency spectrum acquired from the received signal and identifies the receiving timing on the basis of the temporal variations of the frequency spectrum acquired from the received signal; filter information production means is constructed of the function such that the inverse characteristic filter production section 2 produces information (frequency spectrum outputted to the multiplier 3, in this embodiment) for realizing the propagation channel inverse characteristic filter; and filtering implementation means is constructed of the function such that the multiplier 3 filters the frequency spectrum of the received signal by the use of the information.

Here, the construction of the system and the device according to the present invention is not limited to the above-mentioned construction but various constructions may be used. Further, the present invention can be provided as: a method or system for performing the processing according to the present invention; a program for realizing such method or system; or a recording medium for recording the program. In addition, the present invention can be also provided as various devices and systems.

Further, the application of the present invention is not limited to the above-mentioned field but the present can be applied to various fields.

Still further, as for various processings performed by the system and the device according to the present invention, for example, there may be used a constructed in which, for example, in a hardware source having a processor and a memory, the processor is controlled by a control program stored in a ROM (Read Only Memory). Still further, there may be used a construction in which, for example, the respective function means for performing the various processings are constructed as hardware circuits independent of each other. In addition, as the processor for performing the control program can be used various kinds of hardware such as a CPU (Central Processing Unit), a DSP (Digital Signal Processor), a FPGA (Field Programmable Gate Array), and a Reconfigurable Compute Fabric.

Still further, the present invention can be also grasped as a recording medium that can be read by a computer such as a floppy disk (Trademark) and a CD (Compact Disk)-ROM in which the above-mentioned control program is stored or as the control program itself. When the control program is inputted to the computer from the recording medium and is performed by the processor, the processing according to the present invention can be performed.

Here, generally, the device receiving an analog type received signal through a wireless propagation channel converts the analog type received signal to a digital type signal and then performs the demodulation processing or the like. However, it cannot be said that a receiver or like in the related art can ensure a sufficient dynamic range when the received analog signal is converted to the digital signal. Hence, the communication device according to the present invention has a characteristic construction for ensuring a sufficient dynamic range.

Here, the terms used in the following description will be defined as follows.

"Word length" means the number of bits of data.

"Effective word length" means the number of bits containing the effective value of the number of bits of data. For example, when data has 12 bits and the higher-order 6 bits of the data are always 0 and the remaining lower-order 6 bits show values corresponding to a signal, "the effective word length" is 6 bits.

"Over-sampling" means to sample data at a higher sampling rate than a sampling rate (for example, chip rate) of an arbitrary standard.

Figure 14:
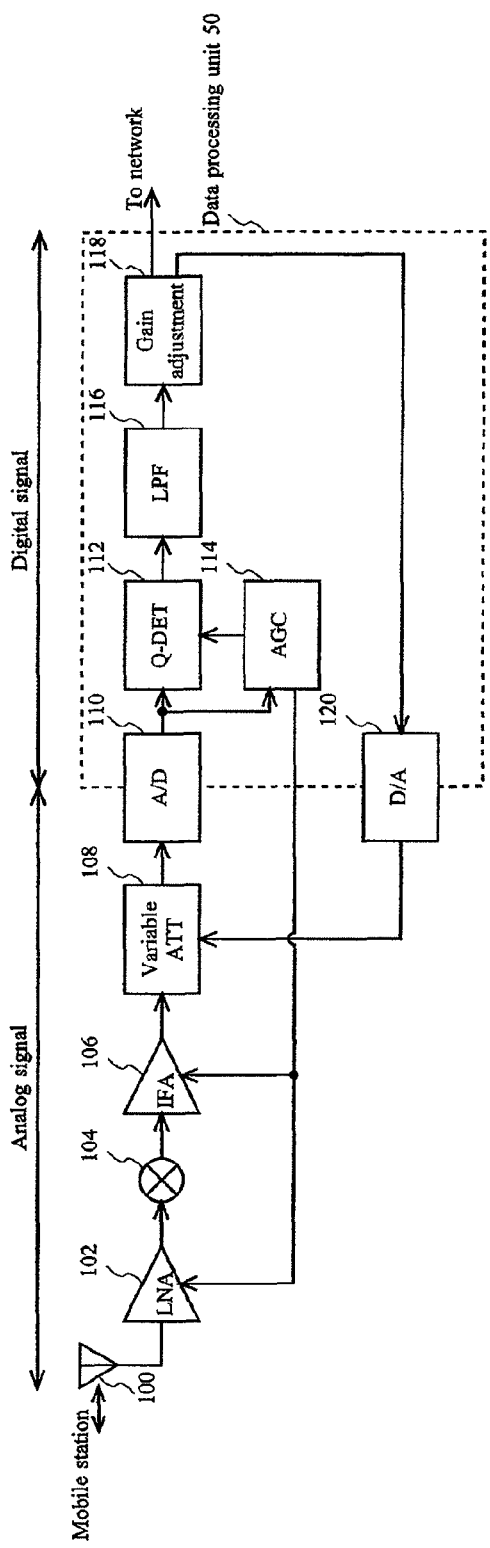
FIG. 14 is a block diagram showing a construction example of a conventional receiver.

First, for the purpose of assisting the understanding of the present invention, the background that urges the inventor to make the present invention will be described by the use of a construction example of a receiver in the related art shown in FIG. 14.

This receiver includes a data processing unit 50 and includes; an antenna 100 for receiving a signal; a low noise amplifier (LNA) 102; a frequency down converter 104; an intermediate frequency amplifier (IFA) 106; a variable attenuator 108; an analog to digital (A/D) converter 110; a quadrature detector (Q-DET) 112; an automatic gain control (AGC) 114; a low-pass filter (LPF) 116; a gain regulation control section 118; and a digital to analog (D/A) converter 120 and performs processing suitable for a signal received from other mobile stations on a network.

The LNA 102 amplifies a signal received through the antenna 100 from the other mobile station on the network and outputs the amplified signal to the frequency down converter 104.

The frequency down converter 104 mixes the received signal with a local oscillation (LO) signal to produce a signal lowered to an intermediate frequency (IF) signal and outputs the IF signal to the IFA 106.

The IFA 106 amplifies the IF signal received from the frequency down converter 104 and outputs the amplified signal to the variable attenuator 108.

The variable attenuator 108 adjusts the amplitude of the IF signal so as to be suitable for the dynamic range of the A/D converter 110.

The A/D converter 110 converts the IF signal to a digital expression signal and outputs the digital signal to the Q-DET 112 and the AGC 114.

The Q-DET 112 separates the digital expression signal into a real component (I component) and an imaginary component (Q component) and outputs them to the LPF 116.

The AGC 114 controls the degree of amplification of the signal inputted from the A/D converter 110 and outputs it to the LNA 102 and the IFA 106, but the AGC 114 can be omitted.

The LPF 116 thins out a signal expressed by a complex number and limits the band of the signal.

The signal outputted from the LPF 116 is subjected to the processing by the gain adjustment control section 118, thereby being brought into desired data.

Here, when the A/D converter 110 is an A/D converter of 12 bits, the data processing unit 50 can mathematically realize a dynamic range of 72 dB.

However, when noises, quantization error, and the magnitude of a peak-to-average power ratio (PAPR) are taken into consideration, the dynamic range actually acquired by the use of the data processing unit 50 is less than 40 dB.

The data processing unit 50 attempts to eliminate the difference between the value of a mathematically acquired dynamic range and the value of an actually acquired dynamic range by the use of the gain adjustment function of the analog signal, but it can be hardly said that a sufficient dynamic range can be ensured by this method.

Figure 15:
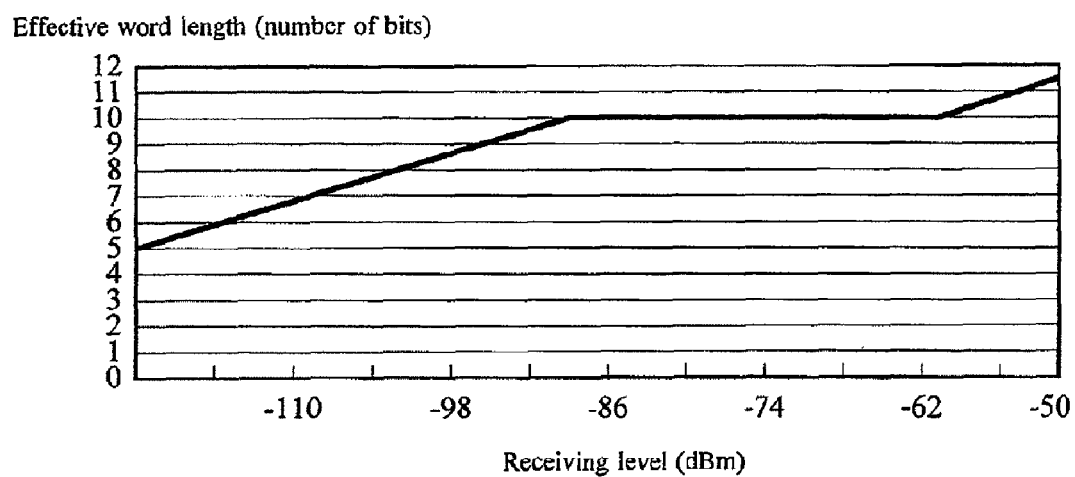
FIG. 15 is a graph showing the relationship between a receiving level and an effective word length in the conventional receiver.

In FIG. 15 is shown the relationship between a receiving level and an effective word length when an A/D converter of 12 bits is used as the A/D converter 110 of the data processing unit 50 (the function of the AGC 114 is neglected). In the portion where the effective word length is flat with respect to the receiving level, the gain control section 118 operates on the assumption that a PAPR would be about 10 dB and in the other portion, the AGC is saturated and hence the effective word length cannot be held.

At this time, although the noise level depends on the receiving level, the noise level is assumed to be constant at about 5 bits.

Thus, the effective word length in the data processing unit 50 is 7 bits (=12 bits−5 bits) even at the maximum.

Figure 8:
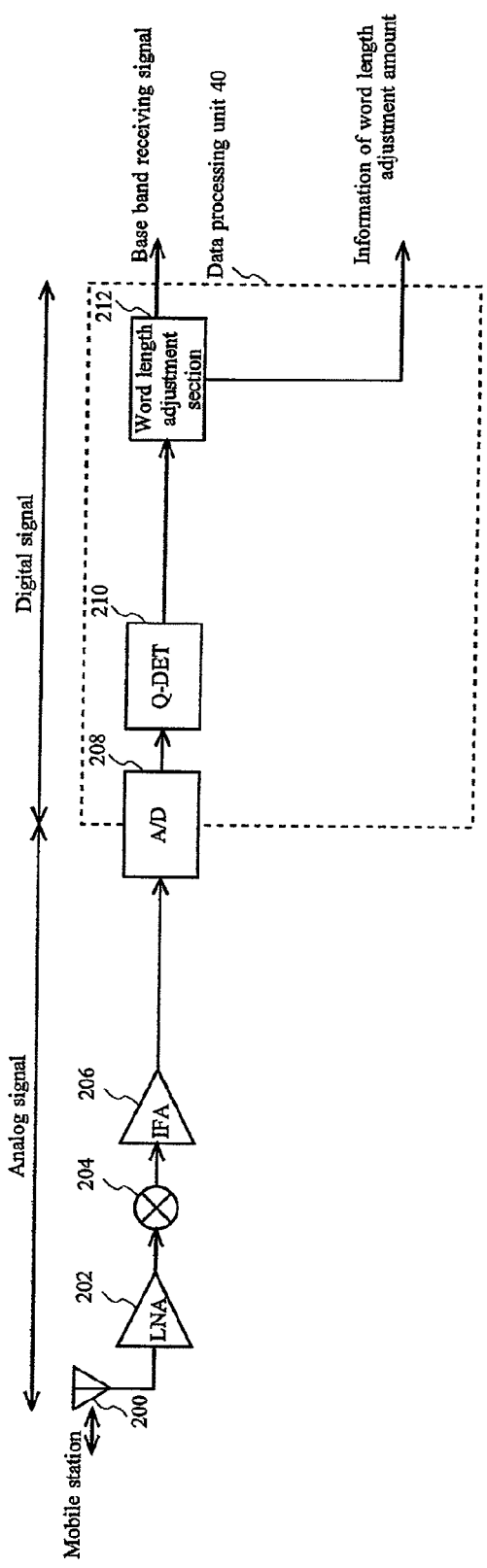
FIG. 8 is a block diagram showing a construction example of a receiver according to one embodiment of the present invention.

Therefore, the communication device according to the present invention, which is shown in FIG. 8 by the construction example of the receiver, includes a data processing unit 40 and includes; an antenna 200 for receiving a signal; an LNA 202; a frequency down converter 204; an IFA 206; an A/D converter 208; a Q-DET 210; and a word length adjustment section 212 and converts a signal received from the other mobile station on the network to a base band receiving signal and outputs the signal to the demodulation section.

The LNA 202 amplifies a signal received via the antenna 200 from the other mobile station on the network and outputs the amplified signal to the frequency down converter 204.

The frequency down converter 204 mixes the received signal with a local oscillation (LO) signal to produce a signal lowered to an intermediate frequency (IF) signal and outputs the IF signal to the IFA 206.

The IFA 206 amplifies the IF signal received from the frequency down converter 104 and outputs the amplified signal to the A/D converter 208.

The A/D converter 208 converts the IF signal to a digital signal at a U times sampling rate (for example, a 4, 8, or 16 times CDMA chip rate) and outputs the digital signal to the Q-DET 210.

The Q-DET 210 separates the digital expression signal into a real component and an imaginary component and outputs them to the word length adjustment section 212.

While quadrature detection is performed to the digital signal in FIG. 8, the quadratic detection may be performed to the analog signal. In other words, the Q-DET 210 may be interposed between the IFA 206 and the A/D converter 208.

The word length adjustment section 212 performs FFT/IFFT operations and word adjustment on the basis of the signal component acquired through the Q-DET 210 (which will be described later with reference to FIG. 9, FIG. 10, FIG. 11, and FIG. 12).

Figure 9:
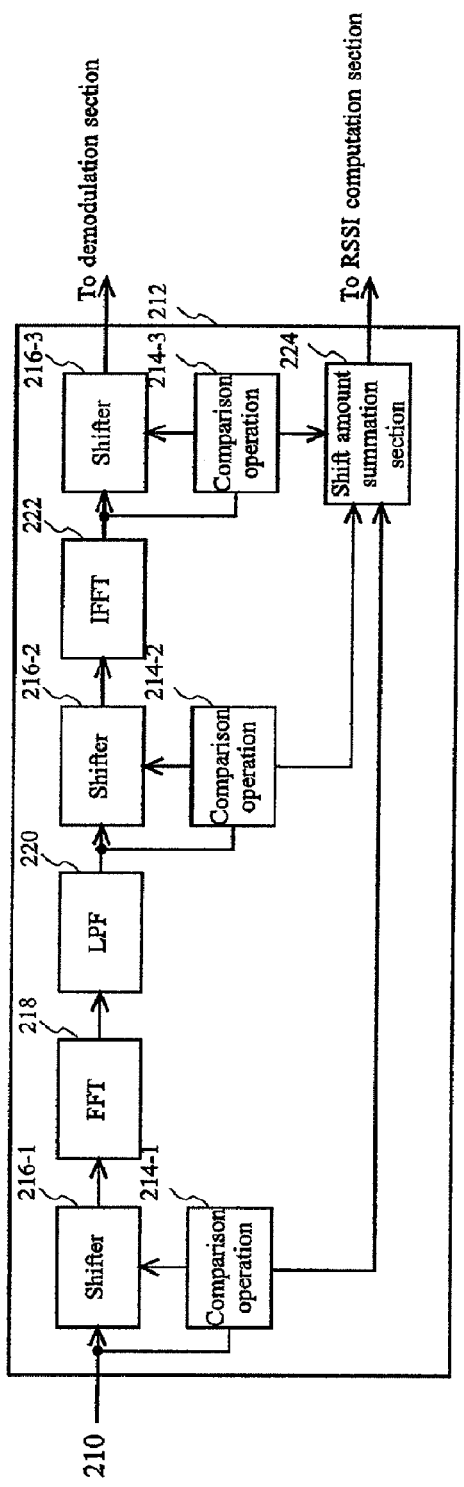
FIG. 9 is a block diagram showing a construction example of a word length adjustment section of the receiver according to the one embodiment of the present invention.

FIG. 9 is a block diagram showing a construction example of the word length adjustment section 212 of the data processing unit 40 of this embodiment.

As shown in FIG. 9, the word length adjustment section 212 includes comparison operation sections 214-1 to 214-3, shifters 216-1 to 216-3, an FFT section 218, a low-pass filter (LPF) 220, an IFFT section 222, and a shift amount summation section 224.

Here, for example, when the word length adjustment section 212 is already provided with the FFT function, like a receiver of an OFDM system, the function can be used as the function of the FFT section 218 and hence the FFT section 218 can be omitted. Further, the LPF 220 can be omitted. Here, in this example, the FFT section 1 and the IFFT section 4 shown in FIG. 1 are included as the FFT section 218 and the IFFT section 222.

Figure 10:
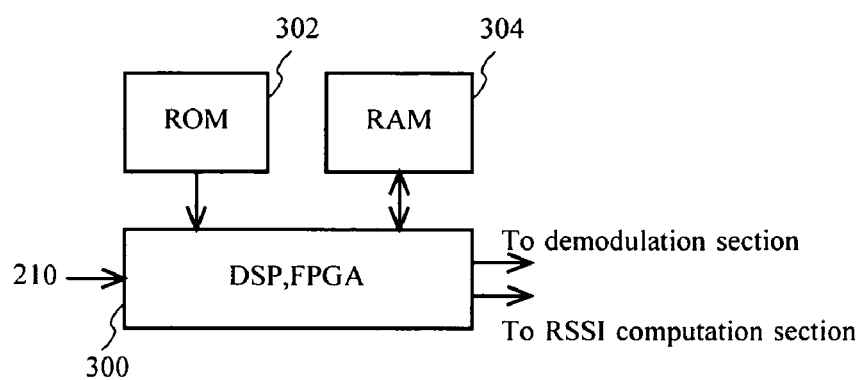
FIG. 10 is a block diagram showing a hardware construction realizing the word length adjustment section of the receiver according to the one embodiment of the present invention.

FIG. 10 is a diagram showing a hardware construction realizing the word length adjustment section 212 of the data processing unit 40 of this embodiment.

As shown in FIG. 10, the data processing unit 40 of this embodiment includes a DSP 300, a ROM 302, and a RAM 304.

The word length adjustment section 212 is realized as software stored in the ROM 302 and executed by the DSP 300.

The comparison operation sections 214-1 to 214-3, the shifters 216-1 to 216-3, the FFT section 218, the LPF 220, the IFFT section 222, and the shift amount summation section 224 are performed as appropriate by software implemented by the DSP 300 and dedicated hardware or any one of these.

These pieces of software are realized as software modules independent of each other and are suitably added or deleted as required and can be started at arbitrary timing by an OS (not shown) or the like.

While the method of realizing the present invention by the software using the DSP 300 has been described here, the method of using hardware such as exclusive LSI, FPGA, and reconfigurable compute fabric may be adopted.

The comparison operation sections 214-1 and the shifter 216-1 perform the shift operation of a suitable number of bits to the signal outputted from the Q-DET 210 and output the signal to the FFT section 218. Here, the details of the shift operation will be described later.

The FFT section 218 performs the FFT operation processing to the signal received from the shifter 216-1 and outputs the frequency component of the signal to the LPF 220.

The FFT section 218 selects suitable sampling points of the U times sampling points received at a U times sampling rate. The FFT section 218 does not discard remaining sampling points but turns all or part of the remaining points into the object of sampling, thereby expanding the dynamic range (when U becomes twice, it is mathematically clear that the S/N ratio is improved by 3 dB).

The LPF 220 performs the processing of multiplying the data subjected to the FFT processing by a rectangular window to remove unnecessary frequency components and outputs the data to the comparison operation section 214-2 and the shifter 216-2. With this processing, of the quantization noises caused uniformly with respect to the frequency, components outside a desired signal bandwidth can be easily removed.

In this regard, the filtering method may be selected according to the system to which the present invention is applied. For example, in the case of the W-CDMA system based on 3GPP, it is desirable to utilize route Nyquist filter characteristics.

The comparison operation section 214-2 and the shifter 216-2 perform the shift operation of a suitable number of bits to the signal received from the LPF 220.

The IFFT section 222 performs the IFFT operation processing to the signal received from the LPF 220 and outputs a time signal (transmitting signal) to the comparison operation section 214-3 and the shifter 216-3.

The comparison operation section 214-3 and the shifter 216-3 perform the shift operation of a suitable number of bits to the information received from the IFFT section 222 and output the information to the demodulation section. The shift amount summation section 224 computes the total sum of the amounts of bit shift determined by the respective comparison operation sections 214-1 to 214-3 and outputs the information of the amount of word length adjustment that expresses the gain of the word length adjustment section 212. This information can be used, for example, for correcting the envelope detection value of a desired signal in an RSSI computation section (not shown) of a later stage.

Further, in the FFT section 218 and the IFFT section 222, for example, computation processing based on many sampling points of, for example, 1024 points is performed, so that the effect of averaging the noises caused by an enormous amount of computation can be produced.

Here, the FFT section 218 shown in FIG. 9 may be replaced by a FIR filter. This is because the Fourier coefficients are essentially computed by the convolution operation of the input signal and the sine wave exp(jwt) and hence can be computed by the use of the FIR filter.

Figure 11:
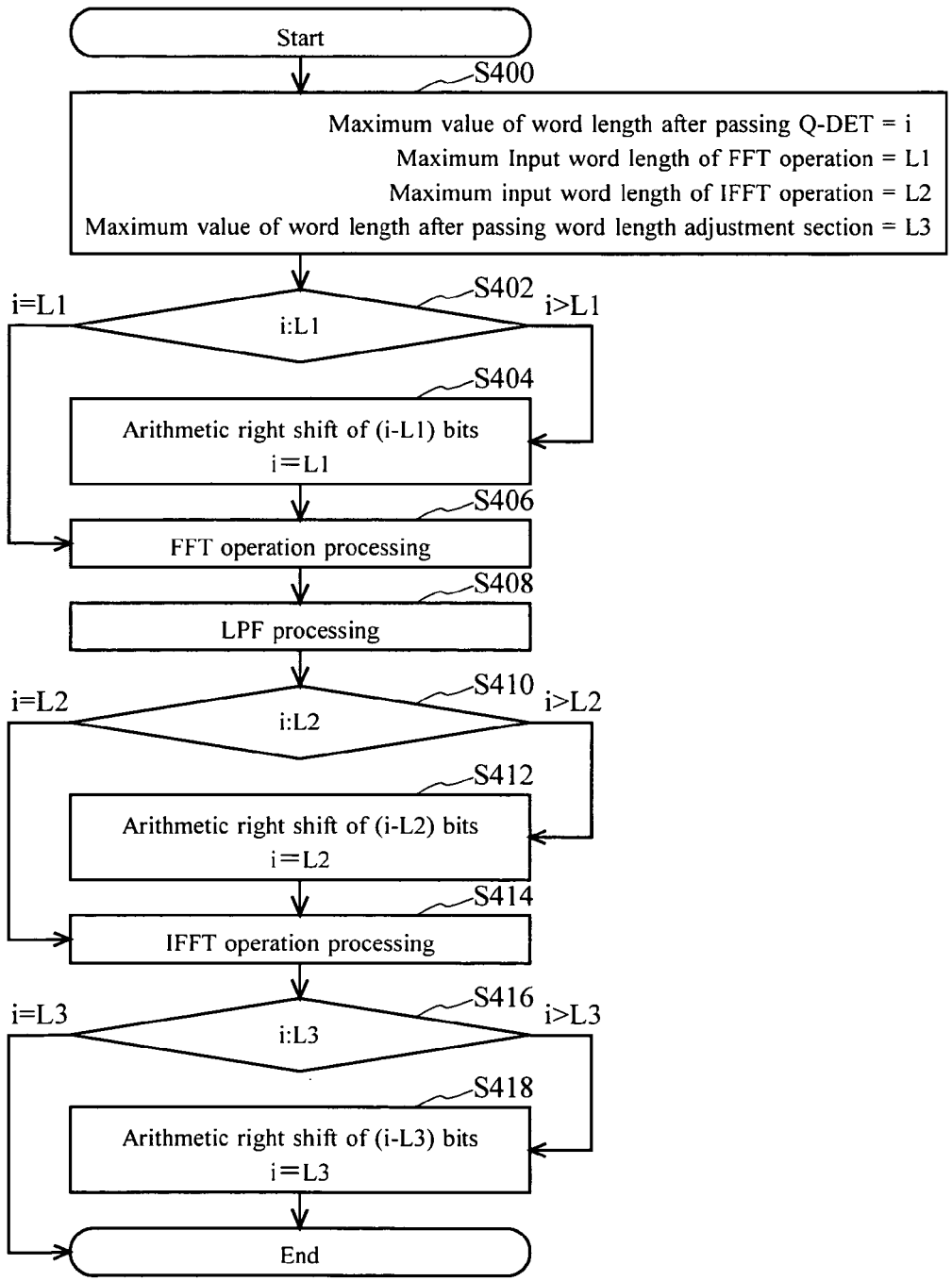
FIG. 11 is a flow chart showing the flow of the word length adjustment section of the receiver according to the one embodiment of the present invention.

FIG. 11 is a flow chart showing the flow of the AGC function such that the word length adjustment section 212 of the data processing unit 40 of this embodiment performs a word length control to the digital signal.

This AGC function can delete the noise level and can expand the effective word length and can be also used for avoiding overflow that can occur in the respective operation processings.

The flow shown in FIG. 11 will be described below.

As shown by this flow, the input word length of the digital data can be controlled by the program.

In step 400 (S400), the program sets the effective word length after passing the Q-DET 210 to i, the input word length when performing the FFT operation to L1, the input word length when performing the IFFT operation to L2, and a desired output word length after passing the word length adjustment section 212 to L3 (i, L1, L2, and L3 are assumed to be numerals representing word lengths and depend on hardware and do not change).

The value i is the same number as the number of samples corresponding to the number of points of the FFT operation in the latter step and is a value determined by searching the maximum value of the absolute value of the amplitude of the signal and by finding the position of the effective highest-order bit of the maximum value. Usually, the relationship of $i \leq L1 \leq L2 \leq L3$ holds, so that if L1 is the effective word length of the quadrature detection signal or larger, L1 may be a value smaller than the output word length of the A/D converter 208.

In step 402 (S402), the program compares sizes between i and L1.

When i>L1, the program proceeds to step 404.

When i=L1, the program proceeds to step 406.

In step 404 (S404), the program performs the arithmetic right shift of (i−L1) bits to the word length after passing the Q-DET 210. After the program substitutes the number of bits after the shift operation into i, the program proceeds to step 406.

In step 406 (S406), the program performs the FFT operation in the FFT section 218. After the program performs the FFT operation, the program proceeds to step 408.

In step 408 (S408), the program performs a weighting multiplying processing (LPF) and then proceeds to step 410 (410).

In step 410 (S410), the program compares sizes between and L2.

When i>L2, the program proceeds to step 412.

When i=L2, the program proceeds to step 414.

In step 412 (S412), the program performs the arithmetic right shift of (i−L2) bits to the word length before the IFFT operation. After the program substitutes the number of bits after the shift operation into i, the program proceeds to step 414.

In step 414 (S414), the program performs the IFFT operation in the IFFT section 222. After the program performs the IFFT operation, the program proceeds to step 416.

In step 416 (S416), the program compares sizes between and L3.

When i>L3, the program proceeds to step 418.

When i=L3, the program finishes the flow.

In step 418 (S418), the program performs the arithmetic right shift of (i−L3) bits to the word length after passing the word length adjustment section 212. After the program substitutes the number of bits after the shift operation into i, the program finishes the flow.

In this regard, the amount of actual shift is different according to whether data is handled by an integer type or by a fixed point type. It suffices to set the amount of shift to an amount that does not cause overflow and underflow but makes it possible to effectively use the dynamic range provided by the word length when the word length is increased through the FFT section 218 and the IFFT section 222.

Figure 12:
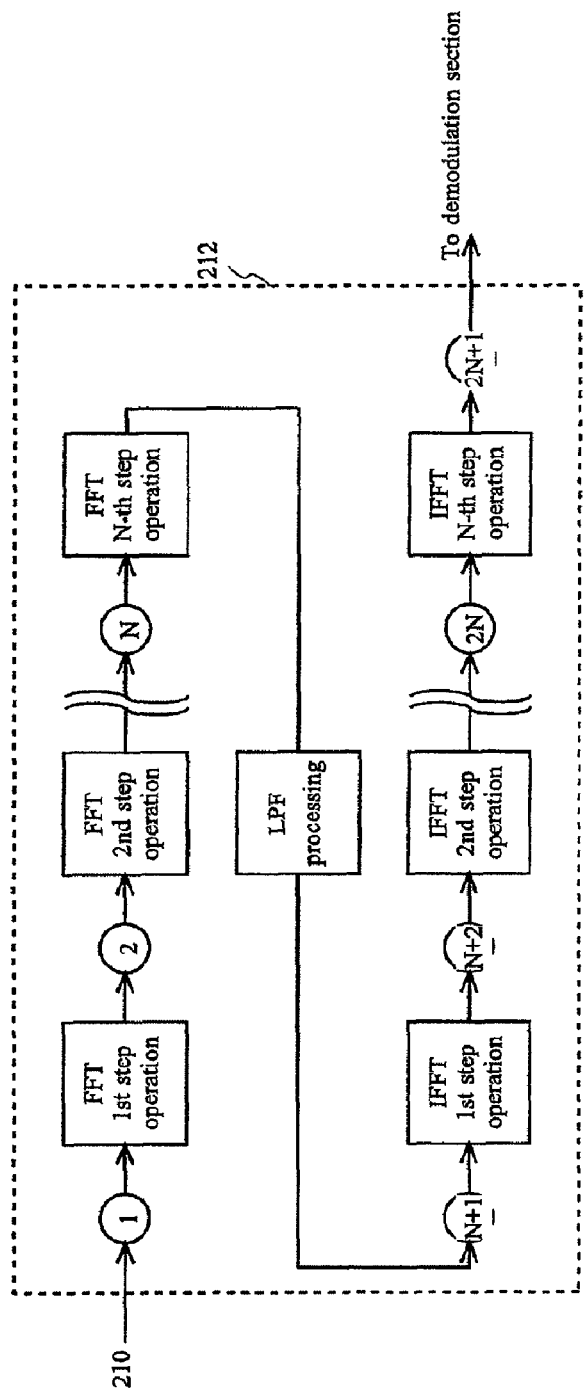
FIG. 12 is a block diagram schematically showing another embodiment of the word length adjustment section of the receiver according to the one embodiment of the present invention.

FIG. 12 is a block diagram schematically showing another example of the data processing unit 40 of this embodiment.

As shown in FIG. 12, if necessary, the word length adjustment section 212 in the data processing unit 40 of this embodiment may be constructed so as to have plural shifters and plural comparison operation sections arranged in the FFT section 218 and the IFFT section 222.

Here, the number of steps represented by N is the number of steps of a butterfly operation and it is assumed that the relationship of P=2N holds between the number of points P and the number of steps N. Further, according to the arrangement of the FFT section 218 and the IFFT section 222, the shifters and the comparison operation sections may be arranged at any positions of (1) to (2N+1) or the plural shifters and the plural comparison operation sections may be arranged at plural positions of (1) to (2N+1).

As described above, the data processing unit 40 of this embodiment performs the shift operation and the FFT/IFFT operations to many over-sampled sampling points at the appropriate positions of the word length adjustment section 212.

In this manner, the data processing unit 40 of this embodiment can keep or expand the dynamic range by the use of the hardware of a minimum word length with respect to the effective word length. Further, the data processing unit 40 of this embodiment can realize the AGC function only by the processing to the digital signal and hence can eliminate the need for providing analog parts, which results in reducing the number of parts and an adjustment process.

Figure 13:
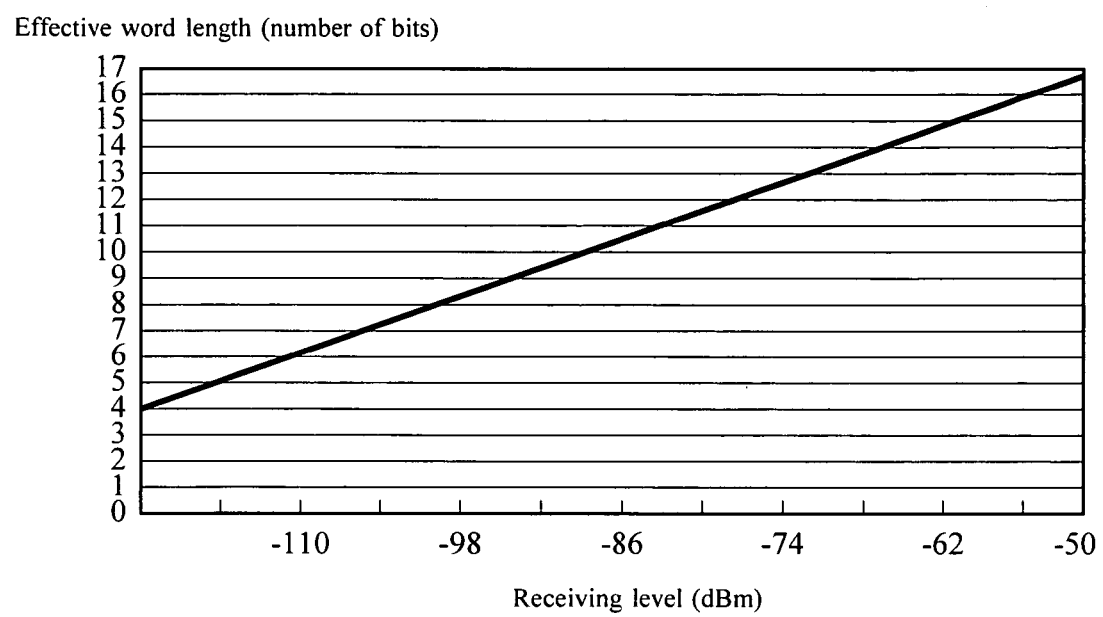
FIG. 13 is a graph showing the relationship between a receiving level and an effective word length in the receiver according to the one embodiment of the present invention.

FIG. 13 is one example showing the relationship between the receiving level and the effective word length when the data processing unit 40 of this embodiment is used. Here, it is assumed that an A/D converter of 14 bits is used and that FFT/IFFT operations of 4096 points are performed.

As shown in FIG. 13, it is clear that the effective word length is improved over about −80 dBm which is the minimum value of operation of the conventional AGC.

The noise level of the signal sampled by the A/D converter of 14 bits is empirically about 7 bits. However, when the signal is subjected to data optimization processing, the noise level of the signal can be reduced to 0 bit. In other words, an increase of 1 bit of the effective word length per 2 steps of the butterfly operation is estimated by the FFT/IFFT operations and hence an expansion of 12 bits of the effective word length can be achieved. Thus, if the effective word length in the A/D converter 208 is 2 bits at the minimum, the effective word length of 14 bits can be obtained.

Here, the above-mentioned description is provided only by way of example and it is not intended to limit the present invention or its application or use by the description.

In particular, the data processing unit disclosed here can be applied to systems other than a cellular phone communication system and the constituent elements disclosed here can be also applied to the other systems and uses.

As described above, according to the communication device in accordance with the present invention, in the system in which each of devices is provided with a frequency spectrum of a pattern specific to the device, it is possible to identify a device that becomes the source of transmission by searching a frequency spectrum coinciding with the frequency spectrum contained by the received signal from the stored contents. Further, when a frequency spectrum of a pattern changing with time is used as the frequency spectrum of a specific pattern, it is possible to extract timing on the basis of the pattern changing with time. In this manner, it is possible to identify a device that becomes the source of transmission and to extract receiving timing by the simple and effective construction.

Further, according to the communication device in accordance with the present invention, it is possible to detect the characteristics of the propagation channel by reducing the frequency spectrum of the device that becomes the source of transmission from the frequency spectrum of the received signal and to realize a filter having the inverse characteristics of the characteristics. Still further, it is possible to compensate the characteristics of the propagation channel by filtering the received signal by the function of the filter realized in this manner. In this manner, it is possible to realize propagation channel distortion compensation by the simple construction and processing.

In addition, according to the communication device in accordance with the present invention, it is possible to ensure a dynamic range sufficient for the communication system by converting the digitalized received signal of time domain to the frequency spectrum that is the signal of frequency domain and by shifting plural bits contained by the converted signal and then by reconverting the signal to the signal of time domain.

The invention claimed is:

1. A communication device for receiving a signal from a device that becomes a communication partner, the device that becomes a communication partner being provided with a frequency spectrum of a pattern specific to the device, the communication device comprising:
   a storage section for storing a correspondence between information identifying the device that becomes a communication partner and the frequency spectrum provided to the device;
   an acquisition section for acquiring a frequency spectrum contained in a received signal;
   an identification section for comparing the frequency spectrum acquired by said acquisition section with the frequency spectrum stored by said storage section to identify a device corresponding to the frequency spectrum that coincides with the frequency spectrum acquired by said acquisition section and which is stored by said storage section,
   wherein a frequency spectrum changing with time according to a specific pattern is used as the frequency spectrum of the pattern specific to the device.

2. A communication device for receiving a signal from a device that becomes a communication partner through a propagation channel, the device that becomes a communication partner being provided with a frequency spectrum of a pattern specific to the device, the communication device comprising:
   a storage section for storing a correspondence between information identifying the device that becomes a communication partner and the frequency spectrum provided to the device; and
   a filter information production section that subtracts the frequency spectrum stored by said storage section from a frequency spectrum of the received signal to detect characteristics of the propagation channel, and that produces information for realizing a filter having inverse characteristics of the characteristics of the propagation channel, the frequency spectrum stored in said storage section being in correspondence with the device that becomes a source of the transmission of the received signal, and
   wherein a frequency spectrum changing with time according to a specific pattern is used as the frequency spectrum of the pattern specific to the device.

3. The communication device as claimed in claim 2, further comprising:
   a filtering implementation section for filtering the received signal by use of the information produced by the filter information production section.

4. The communication device as claimed in claim 1, further comprising:
   a word length adjustment section that converts a digital received signal of time domain to a frequency spectrum of a signal of frequency domain and shifts a plural number of bits contained by the converted signal and then reconverts the signal to a signal of time domain.

5. The communication device as claimed in claim 2, further comprising:
   a word length adjustment section that converts a digital received signal of time domain to a frequency spectrum of a signal of frequency domain and shifts a plural number of bits contained by the converted signal and then reconverts the signal to a signal of time domain.

6. The communication device as claimed in claim 3, further comprising:
   a word length adjustment section that converts a digital received signal of time domain to a frequency spectrum of a signal of frequency domain and shifts a plural number of bits contained by the converted signal and then reconverts the signal to a signal of time domain.

* * * * *